US011398973B2

(12) United States Patent
Raj et al.

(10) Patent No.: US 11,398,973 B2
(45) Date of Patent: Jul. 26, 2022

(54) ROUTE SELECTION USING CUMULATIVE COST

(71) Applicant: HEWLETT PACKARD ENTERPRISE DEVELOPMENT LP, Houston, TX (US)

(72) Inventors: Anil Raj, Bangalore (IN); Anoop Govindan Nair, Bangalore (IN); Venkatavaradhan Devarajan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 100 days.

(21) Appl. No.: 16/536,028

(22) Filed: Aug. 8, 2019

(65) Prior Publication Data
US 2020/0099608 A1 Mar. 26, 2020

(30) Foreign Application Priority Data
Sep. 26, 2018 (IN) .............................. 201841036342

(51) Int. Cl.
H04L 45/122 (2022.01)
H04L 45/021 (2022.01)
H04L 45/00 (2022.01)

(52) U.S. Cl.
CPC .......... *H04L 45/122* (2013.01); *H04L 45/021* (2013.01); *H04L 45/14* (2013.01); *H04L 45/20* (2013.01)

(58) Field of Classification Search
None
See application file for complete search history.

(56) References Cited

U.S. PATENT DOCUMENTS 6,363,319 B1 3/2002 Hsu et al.
2008/0080517 A1 * 4/2008 Roy .................... H04L 12/5692
370/395.5

(Continued)

FOREIGN PATENT DOCUMENTS

JP 2017519378 A 7/2017
WO WO-2014185768 A1 * 11/2014 ............ H04W 40/12

OTHER PUBLICATIONS

Billheimer, J. W. et al., "Network Design with Fixed and Variable Cost Elements," Feb. 1973, pp. 49-74, https://doi.org/10.1287/trsc.7.1.49.

(Continued)

*Primary Examiner* — Saumit Shah
(74) *Attorney, Agent, or Firm* — Hewlett Packard Enterprise Patent Department

(57) ABSTRACT

Examples include determining a first hop for a preferred route from a networking device to a destination device, calculating a cumulative cost for the preferred route based on a cost of the first hop and an original cost of the preferred route, determining whether a secondary route is available, and, in response to a determination that the secondary route is available, determining a first hop in the secondary route. Examples also include determining a cost of the first hop in the secondary route, determining a new route from the networking device to the destination computing device based on the cumulative cost of the preferred route and the cost of the first hop in the secondary route, and entering the new route into a forwarding data structure of the networking device.

20 Claims, 6 Drawing Sheets

(56) References Cited

U.S. PATENT DOCUMENTS

| | | | |
|---|---|---|---|
| 2010/0027427 A1* | 2/2010 | Kokje | H04L 45/12 370/238 |
| 2015/0016242 A1* | 1/2015 | Ernstrom | H04L 45/48 370/218 |
| 2016/0248663 A1 | 8/2016 | Patel et al. | |
| 2017/0126497 A1* | 5/2017 | Dubey | G06F 9/45558 |

OTHER PUBLICATIONS

Atlas, A. et al., "Basic Specification for IP Fast Reroute: Loop-free Alternates," Sep. 2008, https://tools.ietf.org/html/rfc5286.
Cisco, "Specify a Next Hop IP Address for Static Routes," Sep. 2, 2014, https://www.cisco.com/c/en/us/support/docs/dial-access/floaiing-static-route/118263-technote-nexthop-00.html.
Marschke, D. et al., "JUNOS Enterprise Routing: A Practical Guide to JUNOS Software and Enterprise Certification," O'Reilly Media, Inc., Mar. 2008.

\* cited by examiner

ROUTE SELECTION USING CUMULATIVE COST

BACKGROUND

A network may include multiple endpoints attached to networking devices (e.g., routers, switches, etc.). The endpoints may communicate to each other in a variety of ways using the networking devices to relay a data packet across the network. In some examples, a packet is received by a networking device along its pathway to the endpoint and the networking device decides how to forward a packet it receives such that the packet may reach the intended endpoint.

BRIEF DESCRIPTION OF THE DRAWINGS

The following detailed description references the drawings, wherein.

DETAILED DESCRIPTION

Figure 1:
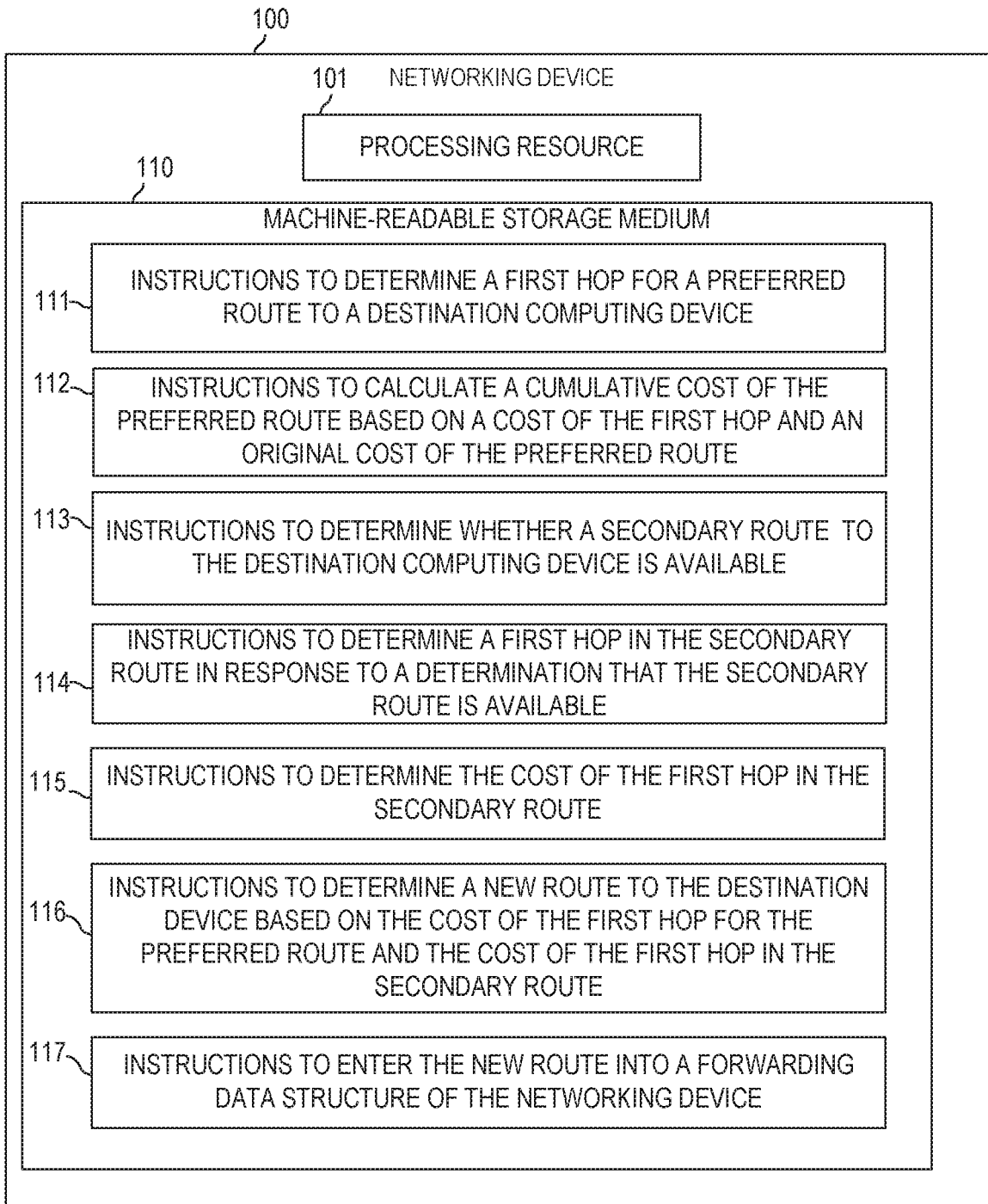
FIG. 1 is a block diagram of a networking device to determine a new route to a destination computing device, according to some examples.

In some examples, a networking device that receives a data packet for a specific destination computing device (i.e. endpoint) may have multiple paths to get to that specific destination computing device. The paths may be stored in a routing data structure (e.g., routing information base) on the networking device. In some examples, an entry in the routing structure may include a desired destination (where the packet is to go) and a connection through which the desired destination may be achieved. The desired destination may correspond to networks and/or subnets and the connection may correspond to a networking device that is connected either directly or indirectly to the networking device. This networking device is a hop in the path.

Additionally, an entry in the routing structure may include additional information about the path, including an administrative distance, and/or the protocol through which the path is made available. For example, the entry may list that the path is made available via a connected interface to the networking device. As another example, the entry may list that the path is made available via OSPF.

In some examples, one route of the possible routes may be a preferred route. For example, a user of the networking device (e.g., an administrator of the network) may set in the routing data structure that a packet destined for a specific destination computing device be routed via a specific path from the networking device. This may be due to the shorter distance of the connection to the hop, the reliability of the connection, etc. In these examples, the preference may be captured by the administrative distance in the entry of the routing data structure.

For example, based on initial configuration (e.g., the links between the networking devices, etc.) of the network, the preferred route may comprise an original hop that is directly connected to the networking device. Since directly connected connections are highly reliable, the preferred route may be assigned an administrative distance of 1 to indicate it as being the highest priority path out of all the possible paths. The setting of this administrative distance ensures that the preferred pathway is chosen and entered into the forwarding data structure of the networking device, thus ensuring that packets are routed through the most efficient and reliable route known at the time the preferred route is set.

However, when the initial configurations change (e.g., the connection between the networking device and the original hop changes etc.), the preferred route may no longer be the most efficient path. This is because while the original connection from the networking device to the original hop may not be available, the networking device may still be able to reach the original hop via a different pathway. For example, the networking device may be able to reach the original hop via OSPF. This different pathway may use additional hops to get to the original hop. These additional hops add delay and may not be reliable as the direct connection that was initially present between the original hop and the network device.

However, even though the preferred route (i.e. one including the original hop) may no longer be the most efficient path, the networking device may still think that it is the most efficient path due to the administrative distance assigned for the preferred route. The administrative distance that is set for the preferred route is based on a connection from the networking device that no longer exists. Thus, even though the networking device is taking a different pathway to get to the original hop, the routing procedure is still considering it with an administrative distance of the original pathway. Thus, in these examples, the networking device may forward the packet along the path that is less efficient than another paths that are available because it does not take into account additional hops that may be needed to get to the original hop of the preferred route.

Examples herein address these technological problems by providing devices and methods to consider the additional costs that additional hops add to the preferred route. In some example, a networking device that receives a packet determines a first hop for a preferred route to a destination computing device. The preferred route may comprise an original hop and the first hop, where the first hop is an alternative path to get to the original hop. The preferred route may also be associated with an original cost (e.g., the administrative distance of the preferred route). The networking device may determine a cumulative cost for the preferred route based on the original cost and a cost that is associated to the first hop. In some examples, the networking device may determine a secondary route to the destination computing device. For example, it may consider an entry in the routing data structure with the second-lowest administrative distance. The networking device may determine a first hop in the secondary route and calculate a cost for the secondary route based on the cost of the first hop. The networking device may then determine a new route to the destination computing device based on the cumulative cost for the secondary route and the cumulative cost for the preferred route. Accordingly, examples disclosed herein allow the networking device to determine a new route to the destination computing device based on an actual cost of the route. The actual cost captures hops that may not have been present in the preferred route when the preferred route was set.

In some examples, a computing device is provided with a non-transitory machine-readable storage medium. The non-transitory machine-readable storage medium includes instructions that, when executed, cause a processing resource to determine a first hop in a preferred route from a networking device to destination computing device and calculate a cumulative cost of the preferred route. The cumulative cost is based on a cost of the first hop and an original cost of the preferred route. The storage medium also includes instructions, that when executed, cause the processing resource to determine whether a secondary route from the networking device is available, determine a first hop in the secondary route, and calculate the cost of the first hop in the secondary route. Additionally, the storage medium includes instructions, that when executed, cause the processing resource to determine a new route from the networking device to the destination device based on the cost of the first hops in the preferred route and the secondary route, and enter the new route into a forwarding data structure of the networking device.

In some examples, a networking device comprises a memory, a routing engine, and a forwarding engine. The memory is to store a forwarding data structure. The routing engine is to determine a preferred route for a packet from the networking device to a destination computing device, determine a first hop for the preferred route comprising a cost, calculate a first cumulative cost for the preferred route based on the original cost and the cost of the first hop, determine whether a secondary route is available, determine a first hop in the secondary route in response to a determination that the secondary route is available, calculate a cost of the first hop in the secondary route, and determine a new route based on the first cumulative cost and the cost of the first hop in the secondary route. The forwarding engine is to update the forwarding data structure with the new route.

In some examples, a method comprises determining a preferred route from a networking device to a destination computing device, determining a first hop in the preferred route, calculating a first cumulative cost for the preferred route based on a cost of the first hop in the preferred route, determining a secondary route from the networking device to the destination computing device, determining a first hop in the secondary route, calculating a second cumulative cost for the secondary route based on a cost of the first hop of the secondary route, determining a new route based on a comparison of the first cumulative cost to the second cumulative cost, and programming the new route into a forwarding data structure of the networking device. In some examples, the preferred route is a static route.

Referring now to the figures, FIG. 1 is a block diagram of a networking device 100 to determine a new route to a destination computing device. As used herein, a networking device may be a device used in a network for the transmission of packets to the network (e.g. from an outside network), from the network (e.g. to an outside network), and/or within the network (from one device in the network to another device in the network). Non-limiting examples of a networking device include a router, switch, etc. Networking device 100 may be connected to other computing devices in the network. As used herein, a "computing device" may include a server, a networking device, a chipset, a desktop computer, a workstation, a mobile phone, a tablet, an electronic reader, or any other processing device or equipment.

As used herein, a destination computing device may be a computing device that is the endpoint for receiving a packet.

Networking device 100 includes a processing resource 101 and a machine-readable storage medium 110. Machine readable storage medium 110 may be in the form of non-transitory machine-readable storage medium, such as suitable electronic, magnetic, optical, or other physical storage apparatus to contain or store information such as instructions 111, 112, 113, 114, 115, 116, 117, related data, and the like.

As used herein, "machine-readable storage medium" may include a storage drive (e.g., a hard drive), flash memory, Random Access Memory (RAM), content-addressable memory (CAM), any type of storage disc (e.g., a Compact Disc Read Only Memory (CD-ROM), any other type of compact disc, a DVD, etc.) and the like, or a combination thereof. In some examples, storage medium 110 may include different types of memory for different types of information. In some examples, a storage medium may correspond to memory including a main memory, such as a Random Access Memory, where software may reside during runtime, and a secondary memory. The secondary memory can, for example, include a non-volatile memory where a copy of software or other data is stored. The storage medium 110 may also include a memory separate from main memory, such as a CAM, to hold data that is used for networking (e.g., forwarding).

In the example of FIG. 1, instructions 111, 112, 113, 114, 115, 116, 117 are stored (encoded) on storage medium 110 and are executable by processing resource 101 to implement functionalities described herein in relation to FIG. 1. In some examples, storage medium 110 may include additional instructions, like, for example, the instructions to implement some of the functionalities described in relation to networking device 200 in FIG. 2, or router 300 in FIG. 3. In other examples, the functionalities of any of the instructions of storage medium 110 may be implemented in the form of electronic circuitry, in the form of executable instructions encoded on machine-readable storage medium, or a combination thereof.

Processing resource 101 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 111, 112, 113, 114, 115, 116, and 117 as described herein.

Instructions 111 may be executable by processing resource 101 to determine a first hop in a preferred route from the networking device 100 to a destination computing device. Destination computing device is not shown in FIG. 1. In some examples, the destination computing device may be in a different network or subnet than networking device 100.

As used herein, a preferred route is a pathway that a data packet should take from networking device 100 to get to a specific data destination computing device. The preferred route is one that is networking device 100 tries to use when it is available. In some examples, it is set by a user (e.g., an administrator) of networking device 100. In some examples, the preferred route may be characterized as a static route because it is not "learned" by networking device 100. It is a pathway that doesn't change if the conditions of the network stay the same as when the preferred route was set.

In some examples, the preferred route comprises an original hop (i.e. another networking device from networking device 100 to which the packet is sent on its way to the destination computing device). At the time the preferred route is set, there is an original pathway to the original hop from networking device 100. This pathway is characterized as being an original pathway because it is a pathway that exists when the preferred route is set as being a preferred route. Thus, the original hop may be characterized as a networking device that the original pathway connects networking device 100 to.

In some examples, the original pathway to the original hop may contribute to the choice of the original hop as being in the preferred route. For example, the destination computing device may be reachable from networking device 100 via many pathways, one of them using the original hop. Additionally, the original hop may be reachable from networking device 100 via multiple pathways. One of these pathways may be directly connected to networking device 100. As used herein, a hop that is directly connected is a hop in which the packet may be sent to a physical interface of networking device 100 to go directly to the networking device for that hop without going through other networking devices. Other pathways may be via hops through other networking devices. Due to a direct connection that networking device 100 has to the original hop, the original hop is set as being in the preferred route. When the original pathway becomes unavailable, there may be other pathways available to the original hop. However, the factors that went into the picking the preferred route are altered and may not be true. For example, the original hop may not be directly connected to networking device 100 but may be indirectly connected via other hops. Accordingly, to accurately account for these hops, instructions 111 may determine a first hop and instructions 112 may calculate a cumulative cost of the preferred route.

Specifically, instructions 111 may be executed to determine a first hop for the preferred route. Networking device 100 may be directly connected to other networking devices other than the networking device for the original hop. These other networking devices may learn of paths that are available to them and advertise these paths to networking device 100 using various routing protocols such as Open Shortest Path First (OSPF), Border Gateway Protocol (BGP), etc. These paths may then be internalized by networking device 100 in the routing data structure. These paths may be used as an alternate paths for the original pathway (e.g., a different way of getting to original hop from networking device 100). Instructions 111 may accomplish this, in some examples, by doing a route lookup in a routing data structure of networking device 100 for the destination computing device. In some examples, the routing data structure may be a table in the form of a Routing Information Base (RIB).

For example, a packet received by networking device 100 may include headers. When executed by processing resource 101, instructions 111 may parse these headers and retrieve an address of the destination computing device. In some examples, the address may be an Internet Protocol (IP) address (e.g., IPv4, IPv6). Instructions 111 may then search the routing data structure for this address.

The result of this specific IP address will return the address of the original hop of the preferred network. Instructions 111 may then use the address of the original hop and perform a look up in the routing data structure to determine whether a first hop exists in the routing data structure. If a first hop does exist, a search for the specific IP address of the original hop will return with an entry that includes the IP address of the first hop. Thus, the first hop may allow the packet to get to the original hop via a different path. Accordingly, in some examples, the first hop may be associated to a networking device that sits in between the original hop and networking device 100. This may be characterized as a recursive lookup.

Instructions 112 may be executable by processing resource 101 to calculate a cumulative cost of the preferred route. The cumulative cost of the preferred route may be based on a summation of a cost of the first hop and an original cost of the preferred route.

In some examples, the cost for the first hop may be an administrative distance that is associated to the routing protocol through which the first hop is available. Additionally, the original cost of the preferred route may be associated to the administrative distance of the preferred route. In some examples, the administrative distance of an entry may correlate to a priority of the pathway that the entry represents. In some examples, administrative distances may be assigned individually to specific pathways. For example, the preferred route may be assigned an administrative distance of 1 while a second-less preferred route may be assigned an administrative distance of 10 (indicating a lower priority). In some examples, administrative distances may be assigned broadly to pathways depending on the routing protocols on which they are available. For example, a route available by the routing protocol OSPF may be assigned a much higher administrative distance, e.g., 110, indicating a lower priority, while routes that are directly connected may be assigned the lowest administrative distance (e.g., 0).

The use of a cumulative cost of the first hop and the original cost of the preferred route may provide an accurate picture of the costs of the preferred route using the new hop(s) to get to the original hop. The preferred route using the new hops may be characterized as an altered preferred route.

Because the first hop for the preferred route may not be directly connected to networking device 100, instructions 112 may include instructions that are executable by processing resource 101 to determine whether the first hop is directly connected to networking device 100. This may allow networking device 100 to accurately account for administrative distances of additional hops that are needed to get to the first hop. In some examples, the routing data structure may include information to indicate whether a hop is directly connected. For example, a hop that is directly connected may have two entries in the routing data structure, with one entry corresponding to the subnet of the address of the networking device associated with the hop. In response to a determination that the first hop is not directly connected, instructions 112 may include instructions to determine a second hop for the preferred route. The second hop may be a hop that sits in between the first hop and networking device 100. The second hop may be determined by looking up the network address of the first hop in the routing data structure of networking device 100. Additionally, instructions 112 may also calculate a cost of the second hop for the preferred route and add that cost to the cumulative cost of the preferred route. In some examples, a determination of a sequential hop may occur and the cost of that sequential hop added to a running cumulative cost for the preferred route until a directly connected hop is reached. For example, if there are 5 hops in addition to the first hop, the cost of all 5 hops are added to a cumulative cost for the preferred route (which already accounts for the cost of the first hop and the original cost of the preferred route).

Instructions 113 may be executable by processing resource 101 to determine whether a secondary route to the destination computing device is available. This may be accomplished by looking up the address of the destination computing device in a routing data structure. A return of an entry is different from the entry associated with the preferred route results in a determination that there is a secondary route. In response to a determination that there is a secondary route, instructions 114 may determine a first hop in the secondary route. The first hop may be the address that is returned in the result of the lookup of instructions 113.

Instructions 115 may be executable by processing resource 101 to calculate a cost of the first hop in the secondary route. As discussed above in relation to the cost of the first hop in the preferred route, the cost of the first hop in the secondary route may be an administrative distance associated with the first hop. In some examples, this may be information that is in the routing data structure.

Because the first hop for the secondary route may not be directly connected to networking device 100, instructions 115 may include instructions that are executable by processing resource 101 to determine whether the first hop of the secondary route is directly connected. This may allow networking device 100 to accurately account for administrative distances of additional hops in the secondary route. In response to a determination that the first hop is not directly connected, instructions 115 may include instructions to determine a second hop for the secondary route. The second hop may be a hop that sits in between the first hop and networking device 100. This may be accomplished by looking up the network address of the first hop in the routing data structure. As discussed above, this may be characterized as a recursive lookup.

Additionally, instructions 115 may also calculate a cost of the second hop for the secondary route and add that to the cost of the first hop for the secondary route. In some examples, a determination of a sequential hop may occur and the cost of that sequential hop added to a running cumulative cost for the preferred route until a directly connected hop is reached. For example, if there are 4 hops, beginning with the first hop leading to a second hop leading to a third hop and leading to a fourth hop, the fourth hop is the hop that is directly connected hop to networking device 100. In this example, the cost of all 4 hops are added to a cumulative cost for the secondary route.

Instructions 116 may be executable by processing resource 101 to determine a new route from the networking device 100 to the destination computing device based on the cumulative cost for the preferred route and the cost of the first hop in the secondary route. For example, the respective costs may be compared to each other. Based on a determination that the cumulative cost of the preferred route is lower than the cost of the first hop for the secondary route, the preferred route (with its additional hops) may be determined as the new route to destination computing device. Based on a determination that the cumulative cost of the preferred route is higher than the cost of the first hop for the secondary route, the secondary route may be determined as the new route to destination computing device. Additionally, based on a determination that the costs are equal, than both routes may be determined as the new routes (e.g., using protocols such as Equal Cost Multi Path (ECMP)). As discussed above, in some examples, other costs may be associated with the preferred route and the secondary route that are captured in respective cumulative costs for each. In these examples, the comparison may be of the cumulative costs.

Instructions 117 may be executable by processing resource 101 to enter the new route (determined by instructions 116) into a forwarding data structure of networking device 100. In some examples, the forwarding data structure may be a Forwarding Information Base (FIB). In some examples, the forwarding data structure may be stored in a portion of the machine-readable storage medium 110 corresponding to a CAM, as discussed above.

Accordingly, examples discussed herein allow for a networking device to consider the costs of additional hops that are not original to a preferred route. For example, when the costs of these additional hops are not considered, a networking device may use an additional hop to get to the original hop of the preferred route but still use the original cost of the original hop of the preferred route when considering the preferred route with the additional hops. This ignores the additional costs that these additional hops add to the preferred route and results in an inaccurate information being used to determine the best route to a destination computing device. Accordingly, in some examples, this may result in the networking device picking one path when there is a path with a lower cost available. Examples discussed herein allow for the consideration of these additional costs.

Figure 2:
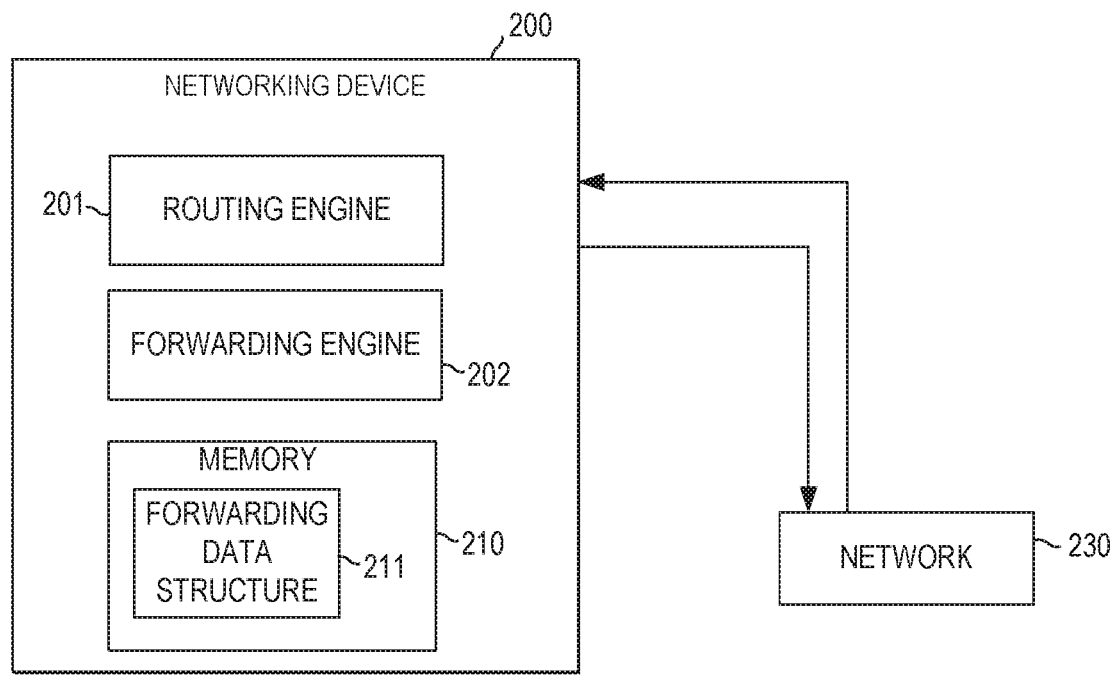
FIG. 2 is block diagram of a networking device with a forwarding engine to generate a forwarding data structure based on a new route to a destination computing device, according to some examples.
Figure 3A:
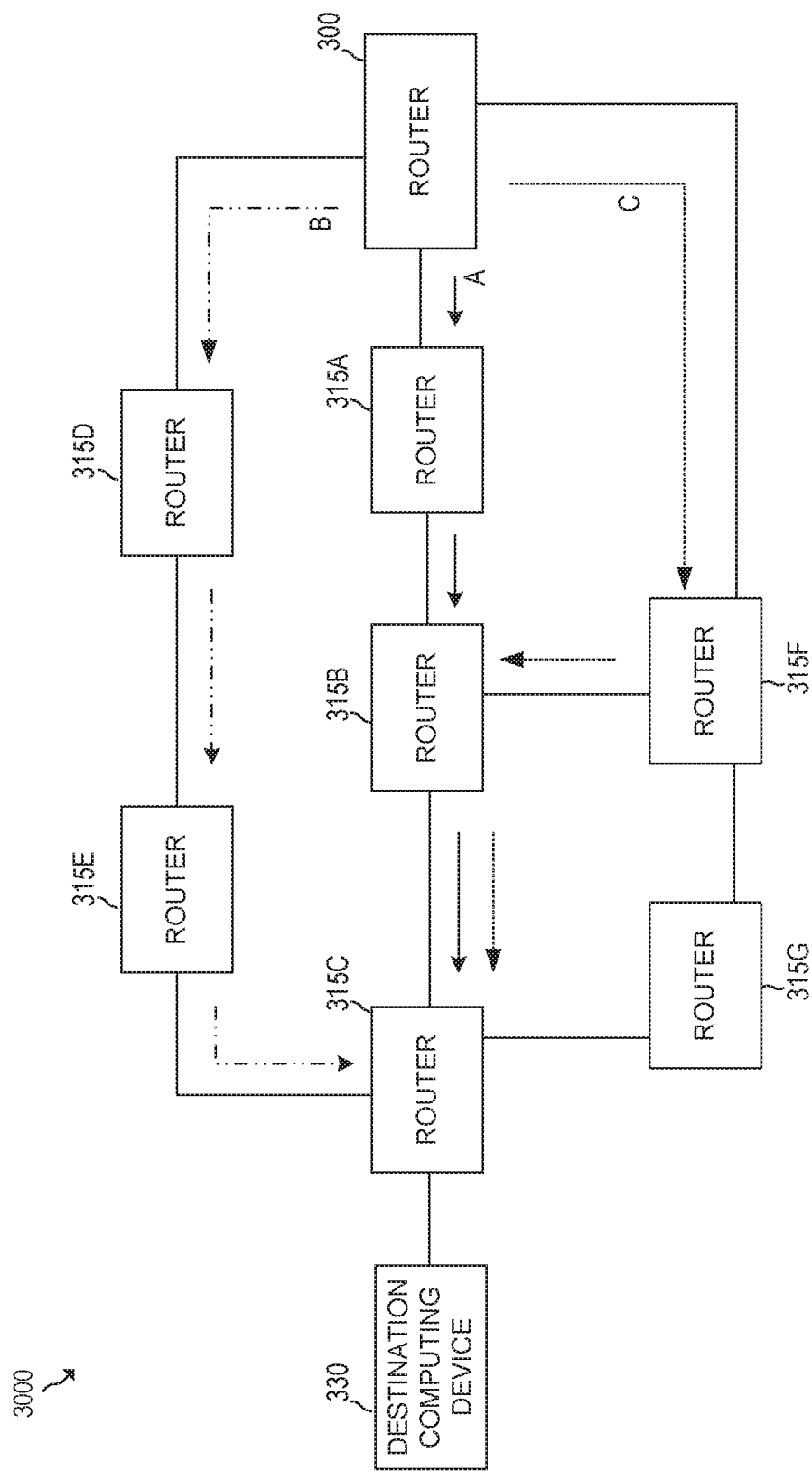
FIG. 3A is a block diagram of a network comprising multiple routes from a router to a destination computing device, according to some examples.
Figure 3B:
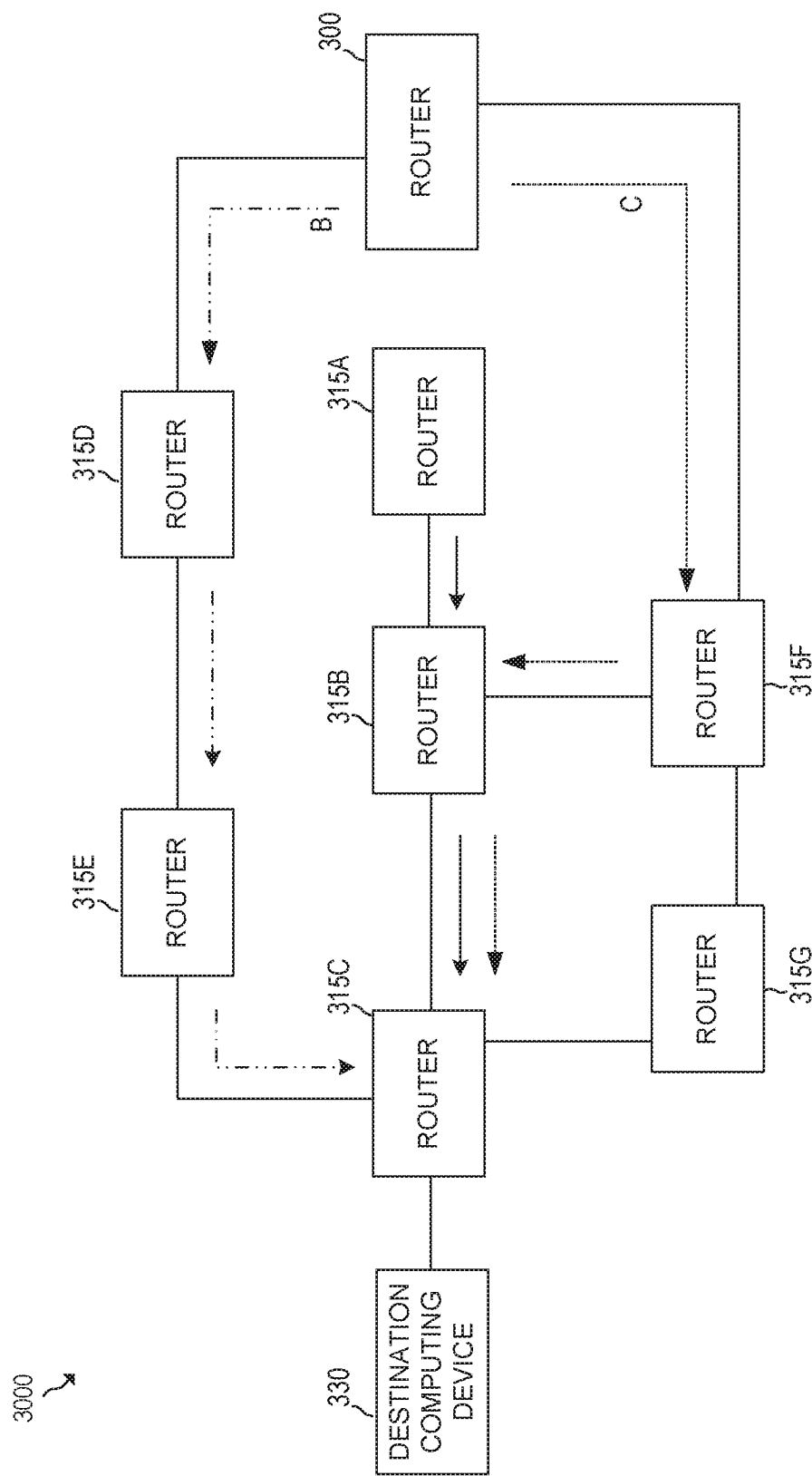
FIG. 3B is the network of FIG. 3A, when a link between two routers is unavailable, according to some examples.

Networking device 100, which is described in terms of instructions and processing resource, may include aspects of networking device 200 of FIG. 2 or router 300 of FIGS. 3A-3B.

FIG. 2 shows a block diagram of a networking device 200 connected to network 230. Networking device 200 comprises a routing engine 201, a forwarding engine 202, and a memory 210. Network 230 may comprise other networking devices.

Each of engines 201, 202 and any other engines, may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or hardware and software hosted at hardware. Additionally, as used herein, the singular forms "a," "an," and "the" include plural referents unless the context clearly dictates otherwise. Thus, for example, the term "engine" is intended to mean at least one engine or a combination of engines.

Each engine of networking device 200 can include at least one machine-readable storage mediums (for example, more than one) and at least one computer processor (for example, more than one). For example, software that provides the functionality of engines on networking device can be stored on a memory of the networking device 200 to be executed by a processor of networking device 200.

Memory 210 may comprise a storage medium as discussed above. In some examples, memory 210 may be separate from the memory that stores the software and/or data for the functionality of engines on networking device and comprises a storage medium that allows for quick retrieval of information that is used for moving (e.g., forwarding) data packets received by networking device 200. A non-limiting example for memory 210 is a CAM. Memory 210 may be used to store a forwarding data structure 211. In some examples, the forwarding data structure 211 comprises a Forwarding Information Base (FIB). In some examples, storing forwarding data structure 211 in a specialized memory such as a CAM separate from data used to determine routing decisions (e.g., data used by routing engine 201) allows for a separation in networking device 200 between the portion of the networking device 200 that determines a best path for a specific packet and the portion that handles the packet forwarding. This allows for a more consistent performance of the data forwarding by networking device 200.

Routing engine 201 includes a combination of hardware and software that allows networking device 200 to determine a preferred route for a data packet received by networking device 200. The data packet may originate from a computing device in network 230 and is destined for destination computing device in network 230. The data packet may include a header that includes information to identify the destination computing device. In some examples, the information comprises an IP (e.g., IPv4, IPv6, etc.) address. In some examples, routing engine 201 may use the identifying information (e.g., IP address) to search a routing data structure (e.g., RIB). Accordingly, in some examples, routing engine 201 may comprise a storage medium that stores the routing data structure.

In some examples, there may be one entry in the routing data structure that matches the destination computing device. In these examples, routing engine 201 may determine that this path is the preferred route to the destination computing device.

In some examples, there may be a variety of entries in the routing data structure that match the identifying information. Each entry may have a priority assigned to the route. In these examples, routing engine 201 may use the priority assigned to the route to determine the preferred route. In some examples, the priority is a numeric character. In some examples, the priority may be an administrative distance.

For example, a user of networking device 200 may determine that there are two static routes available to the specific destination computing device. One static route may be via one networking device and the other static route may be via another networking device. Both of these routes are entered into the routing data structure of networking device 200 and are associated with an administrative distance. One static route may have a lower administrative distance than the other static route. In examples that there are a variety of entries in the routing data structure, routing engine 201 may determine the preferred route by using the route with the lower administrative distance (aligning with a higher priority). In some examples, the preferred route includes an original cost. The original cost of the preferred route may be the administrative distance of the route.

Routing engine 201 also allows networking device 200 to determine a first hop for the preferred route. For example, a destination computing device may have an IP address of 50.1.1.5. A search for this IP address in networking device 200's routing data structure may return an entry having a cost of 1, indicating that it is a preferred route. The entry may also include address of another networking device, 10.1.1.2. The address of this other networking device 10.1.1.2 is the original hop in the preferred route. To determine a first hop for the preferred route, routing engine 201 may look up address 10.1.1.2 (the original hop) in the routing data structure. The result of this look up is the first hop. The first hop, in these examples, is a networking device through which the packet may get to the original hop. The first hop may comprise a cost. As discussed above, this cost may be an administrative distance that is associated to how the hop is achieved (e.g., protocols, etc.)

Routing engine 201 may also allow networking device 200 to calculate a first cumulative cost for the preferred route based on the cost of the first hop and the original cost of the preferred route. This is similar as described above in relation to instructions 112.

Routing engine 201 additionally allows networking device 200 to determine whether a secondary route for the packet from networking device 200 to the destination computing device is available. As discussed above, the routing data structure used by routing engine 201 may include multiple entries for a specific destination computing device. For example, a search in the routing data structure for the destination computing device with an address of 50.1.1.5 may match two entries. The entry with the highest priority (e.g., lowest original cost) may be determined as the preferred route. The entry with the second-highest priority may be determined as the secondary route. Thus, the routing engine 201 may determine that a secondary route exists based on the determination that there is a result from the search in the destination computing device that is different from the preferred route.

In response to a determination that there is a secondary route available, routing engine 201 may determine a first hop in the secondary route. The first hop for the secondary route may refer to a networking device that allows the packet to take the secondary route. Accordingly, the address that is returned from the search is the first hop for the secondary route. For example, a search in the routing data structure for the destination computing device with an address of 50.1.15 may return with a secondary route via address 11.1.1.4. The address 11.1.1.4 and the networking device associated with it may be considered the first hop for the secondary route. Accordingly, as compared to the first hop for the preferred route, the first hop for the secondary route may be the first networking device that is found based on a search for the destination computing device. The first hop for the preferred route, on the other hand, is a networking device that is found after the first networking device (where the first networking device is found based on a search for the destination computing device).

Routing engine 201 allows networking device 200 to determine a cost of the first hop in the secondary route. As discussed above, in some examples, this may be an administrative distance that is associated with the entry for the first hop.

Based on the cumulative cost of the preferred route and the cost of the first hop of the secondary route, routing engine 201 allows networking device 200 to determine a new route. The description of instructions 116 is applicable here.

Forwarding engine 202 includes a combination of hardware and software that allows networking device 200 to update forwarding data structure 211 with the new route determined by routing engine 201. In some examples, the new route is programmed into the forwarding data structure. In some examples, the forwarding engine 202 may change the forwarding data structure such that it reflects the new route. For example, instead of entering a port association that refers to the preferred route, it may enter a port association that refers to the secondary route.

In some examples, the first hop for the preferred route may not be directly connected to networking device 200. Accordingly, routing engine 201 may also determine whether the first hop for the preferred route is directly connected. In some examples, this is indicated in the routing information database. Based on a determination that the first hop for the preferred route is not directly connected, routing engine 201 may determine a second hop for the preferred route. This second hop may sit in between the first hop and the networking device 200. In some examples, routing engine 201 may determine the second hop by doing a route look up for the address of the networking device of the first hop. This may be characterized as a recursive lookup and may continue until routing engine 201 finds a hop that is directly connected to networking device 200. These additional hops may be associated with costs. For example, the second hop in the preferred route may have a cost. In some examples, the costs of these additional hops are also added to the cumulative cost for the preferred route.

Similarly, the first hop for the secondary route may not be directly connected to networking device 200. Accordingly, routing engine 201 may also determine whether the first hop for the secondary route is directly connected. In some examples, this is indicated in the routing information database. Based on a determination that the first hop for the secondary route is not directly connected, routing engine 201 may determine a second hop for the secondary route. This second hop may sit in between the first hop and the networking device 200. In some examples, routing engine 201 may determine the second hop by doing a route look up for the address of the networking device of the first hop for the secondary route. This may continue until routing engine 201 finds a hop in the secondary route that is directly connected to networking device 200. These additional hops may be associated with costs. For example, the second hop in the secondary route may have a cost. In some examples, the costs of these additional hops are also added to the cost of the first hop in the secondary route such that the secondary route has a cumulative cost. In these examples, the determination of the new route may be based on a comparison of the cumulative cost for the preferred route and the cumulative cost for the secondary route.

Additionally, the entry in the forwarding database structure comprises the port that leads to the hop in the new route that is directly connected to networking device 200.

Networking device 200, which is described in terms of engines, may include aspects of networking device 100 of FIG. 2 or router 300 of FIGS. 3A-3B.

FIGS. 3A-3B illustrate a network with three pathways (A, B, C,) from a router 300 to a destination computing device 330. FIG. 3A illustrates the situation where an original pathway to an original hop in a preferred route is available. FIG. 3B illustrates the situation where the original pathway is unavailable.

Network 3000 comprises router 300 and destination computing device 330 linked by routers 315A-315G. Router 300 is directly connected to router 315A, router 315D, and router 315F. Router 300, 315F, 315B, and 315C are running routing protocol ©SPF. A packet received by router 300 destined for destination computing device 330 has three paths, paths A, B, and C from router 300. Router 300 may include components of networking device 100 and/or components of networking device 200.

Due to the initial configurations of the networking environment, path A (via original hop 315A) is the preferred route. The preferred route has an original cost (e.g., administrative distance) associated with it of 1. Path B (via hop 315D) is set as a second priority route. It may be associated with a cost of 10. Specifically, assuming that the destination computing device 330 has an IP address of 50.1.1.5, router 315A has IP address of 10.1.1.2, and router 315F has an IP address of 11.1.1.4, the routing data structure for router 300 may include entries:

(1) 50.0.0.0/8 vrf default
   via 10.1.1.2, [1/0], static
(2) 50.0.0.0/8 vrf default
   via 11.1.1.4, [10/0], static Entry (1) corresponds to path A and entry (2) corresponds to path B. Accordingly, when network 3000 is operating with conditions similar to the initial conditions of when the preferred route is set, a packet from router 300 takes path A because a lookup of 50.1.1.5 in the routing data structure of router 300 returns back the entry (1) as the preferred route.

The routing data structure may also include entries that show the 10.1.1.2 (router 315A) is directly connected to router 300. For example, the routing data structure may include:

(3) 10.1.1.0/24, vrf default
   via 1/1/3, [0,0], connected

However, the original pathway may become unavailable. FIG. 3B shows a situation where the link between router 300 and router 315 becomes unavailable. The routing data structure entry (3) above is deleted. However, router 315A (original hop) of the preferred route is still up and running and the preferred route A is still configured as the preferred route in the routing data structure. Accordingly, router 300 determines whether the original hop (router 315A) is available via another pathway.

Based on network 3000, router 315A is still accessible from router 300 by router 315B, which is connected to router 315F, which is connected to router 300. Because routers 315F, 315B, and router 300 are running the protocol OSPF, router 300 learns of this OSPF pathway in order to reach router 315A (the original hop of the preferred route). Accordingly, the entry (3) above is replaced with the following entry:

(4) 10.1.1.0/24, vrf default
   via 12.1.1.3 [110/101], ospf

When router 300 is determining the connection for preferred route A, the router 300 does a search for 50.1.1.5 in the routing data structure. Based on entry (1), router 300 determines that the route A with original hop 315A is the preferred route. Router 300 then does a lookup in routing data structure for the address associated with router 315A. However, because the link between router 300 and router 315A is unavailable, entry (3) is no longer in the routing data structure. Instead, the result that comes back is entry (4), which represents the first hop (315F) in the preferred route. This entry is learned by the OSPF protocol and the first hop (315F) allows the packet to get to the original hop (315A). As can be seen by entry (4), the cost (110) of this first hop is higher than the cost (0) associated with the original entry (3). Thus, in actuality, the cost for the preferred route with the additional first hop is 110, not 1 (the original cost of the preferred route).

Accordingly, to accurately determine a cost of the preferred route, router 300 may calculate a cumulative cost that includes the original cost of the preferred route (1) and the cost of the first hop (110). Additionally, router 300 may determine whether the first hop is directly connected to router 300. This may be done by searching for 12.1.1.3 (the address of the first hop 315F) in the routing data structure. A look up for this results in the following entry:

(5) 12.1.1.0/24, vrf default
   via 1/1/1 [0/0], connected

Thus, this entry indicates that the first hop (315F) is directly connected and no additional lookups for sequential hops are required.

Router 300 may also explore the secondary route. Based on entry (2), router 300 knows that the pathway through router 315D is a secondary route. The address 11.1.1.4 in entry (2) is thus the first hop in the secondary route. This corresponds to router 315D. Router 300 may also determine a cost associated with the first hop in the secondary route. According to entry (2), this is 10. Router 300 may also determine whether the first hop in the secondary route is directly connected to router 300 by doing a lookup of the address for the first hop (router 315D, 11.1.1.4) in the routing data structure.

This returns entry (6) below:
(6) 11.1.1.0, vrf default
   via 1/1/2, [0,0], connected Thus, entry (6) indicates that the first hop is directly connected and no additional lookups for sequential hops are required. In examples where it is not directly connected, router 300 may determine additional hops until a directly connected hop is found. Additionally, router 300 may add the costs of those additional hops to the cost of the first hop to determine a cumulative cost for the secondary route.

Accordingly, router 300 may determine a new route for to destination computing device 330 by comparing the cumulative costs of the preferred route and the secondary route. In this example, the secondary route costs less than the preferred route (10 versus 110). Accordingly, the secondary route is determined as the new route.

Router 300 may program the new route into a forwarding data structure of router 300 as discussed above in relation to instructions 117 and/or forwarding engine 222. While the examples of FIGS. 3A and 3B show specific routing data structure entry formats and specific routing protocols (e.g., OSPF), other types of routing entry formats and routing protocols may be used.

Figure 4:
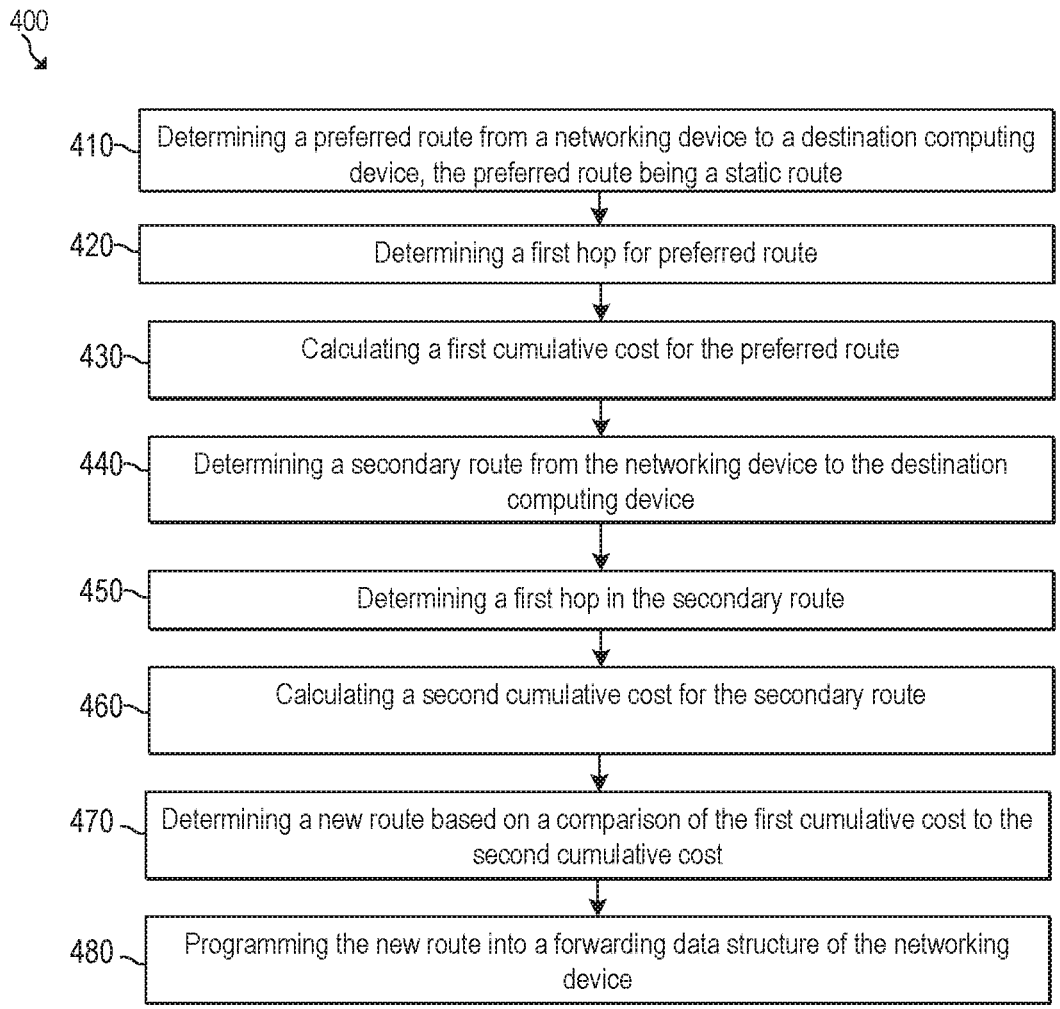
FIG. 4 is a block diagram of a flowchart of determining a new route to a destination computing device, according to some examples.

FIG. 4 illustrates a flowchart for method 400 to determine a new route for a packet. Although execution of method 400 is described below with reference to networking device 200, other suitable devices for execution of method 400 may be used (e.g., networking device 100 of FIG. 1, router 300 of FIG. 3.)

At 410, routing engine 201 may determine a preferred route from networking device 200 to a destination computing device. In some examples, the preferred route is a static route that is entered into a routing data structure of networking device 200 by a user of networking device 200. The preferred route may have an original cost, as discussed above.

At 420, routing engine 201 may determine a first hop for the preferred route. In some examples, the first hop may allow the packet to reach an original hop in the preferred route.

At 430, routing engine 201 may calculate a first cumulative cost for the preferred route. The first cumulative cost comprises the cost for the first hop in the preferred route and an original cost of the preferred route.

At 440, routing engine 201 may determine a secondary route from the networking device to the destination computing device. For example, routing engine 201 may do a lookup of an address of the destination computing device in the routing data structure of routing engine 201. A result that is different from the preferred route may be considered the secondary route.

At 450, routing engine 201 may determine a first hop in the secondary route. In some examples, this is the address that is returned from 440. Additionally routing engine 201 may determine that the first hop is not directly connected to the networking device 200. Based on this determination, routing engine 201 may determine a second hop in the secondary route. In some examples, the second hop sits in between the first hop and networking device 200. Routing engine 201 may do a lookup in the routing data structure of an address associated to the first hop. The result of this lookup is the second hop.

At 460, routing engine 201 calculates a cumulative cost for the secondary route. This cumulative cost may be characterized as a "second" cumulative cost in comparison to the cumulative cost for the preferred route. The use of "first" or "second" to detail a cumulative cost does not correlate to the order in which the cumulative costs are determined or the number of cumulative costs for each route. For example, a second cumulative cost for the secondary route does not mean that there are two costs determined for the secondary route. Rather, the use of second is to distinguish it from the cumulative cost calculated for the preferred route. The second cumulative cost may be a summation of the costs of the first hop and the second hop.

At 470, routing engine 201 determines a new route to the destination computing device based on a comparison of the first cumulative cost to the second cumulative cost.

At 480, forwarding engine 202 programs the new route into forwarding data structure 211 in memory 210.

Although the flowchart of FIG. 4 shows a specific order of performance of certain functionalities, method 400 is not limited to that order. For example, some of the functionalities shown in succession may be performed in a different order, may be executed concurrently or with partial concurrence, or a combination thereof. In some examples, functionalities described herein in relation to FIG. 4 may be provided in combination with functionalities described herein in relation to any of FIGS. 1, 2, 3A-3B, and 5.

Figure 5:
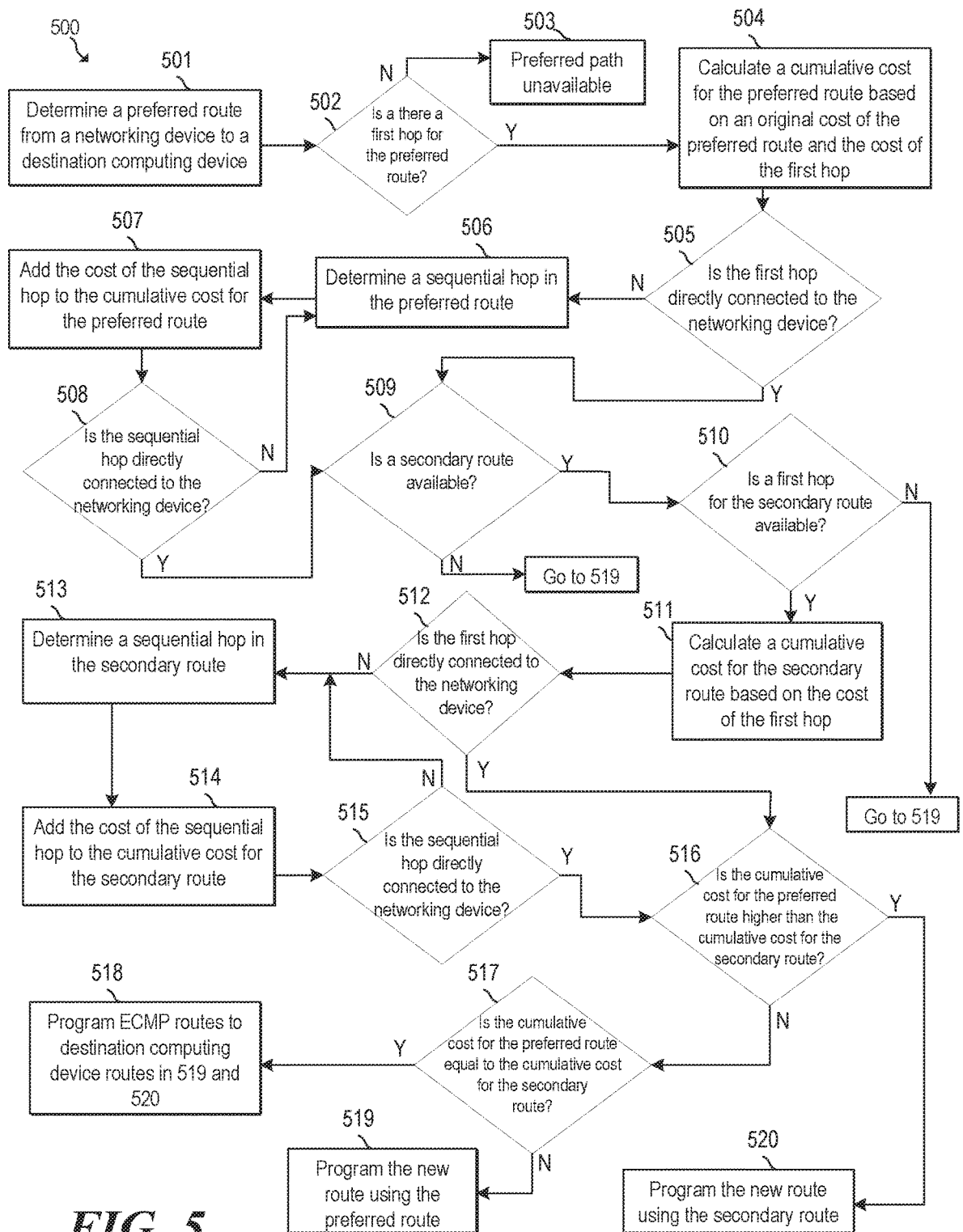
FIG. 5 is block diagram of a flowchart to determine cumulative costs of multiple routes to a destination computing device, according to some examples.

FIG. 5 illustrates a flowchart for a method 500 to determine cumulative costs for the preferred route and the secondary route. Although execution of method 500 is described below with reference to networking device 200, other suitable devices for execution of method 500 may be used (e.g., networking device of FIG. 1, router 300 of FIGS. 3A-3B, etc.).

At 501, routing engine 201 determines a preferred route for a data packet from networking device 200 to a destination computing device. In some examples, this is based on a destination address in the header of the data packet and a routing data structure on networking device 200. Specifically, routing engine 201 may look up the destination address in the routing data structure and choose the entry that has the highest priority. In some examples, the entry will have an address of a networking device through which the destination address may be reached. This networking device (along with its address) may be characterized as an original hop. The preferred route may have an original cost. For example, a static preferred route may have a cost of 1. The cost may be stored in the routing data structure in a manner that associates it with the preferred route. In some examples, the cost may be the administrative distance.

At 502, routing engine 201 determines if there is a first hop for the preferred route. For example, routing engine 201 may search the routing data structure for the address of the original hop. This may result in a match that comprises an address of a networking device. This networking device may be characterized as the first hop. In other words, the first hop is the alternate pathway that the packet may use to get to the original hop of the preferred route. As discussed above, the first hop may have a cost. The cost may be stored in the routing data structure in a manner that associates it with the first hop.

Based on a determination that a first hop is unavailable, method 500 goes to 503 where routing engine 201 determines that the preferred path is unavailable. Based on a determination that a first hop is available, method 500 goes to 504. At 504, routing engine 201 calculates a cumulative cost for the preferred route based on an original cost of the preferred route and the cost of the first hop. In some examples, the original cost for the preferred route and the cost of the first hop may be summed to get the cumulative cost for the preferred route.

At 505, routing engine 201 determines whether the first hop is directly connected to networking device 200. This may be based on information in the routing data structure, as discussed above in relation to FIGS. 3A-3B. Based on a determination that the first hop is not directly connected to networking device 200, method proceeds to 506. Based on a determination that the first hop is directly connected to networking device 200, method proceeds to 509.

At 506, routing engine 201 determines a sequential hop in the preferred route. At 507, routing engine 201 determines the cost of the sequential hop and adds that cost to the cumulative cost for the preferred route. At 508, routing engine 201 determines whether the sequential hop is directly connected to networking device. Based on a determination that the sequential hop is not directly connected, method 500 goes back to 506, where it determines another sequential hop. Accordingly, a sequential hop may include a second hop, a third hop, a fourth hop, etc. in the preferred route. The next (n+1) hop may be determined by looking up the address associated with the current hop (n) in the data routing structure. For example, based on a determination that the fourth hop is not directly connected to networking device 200, routing engine 201 goes back to 506. At 506, routing engine 201 determines a fifth hop in the preferred route. This may be done by looking up the address associated with the fourth hop in the data routing structure. As discussed above, this may be characterized as a recursive lookup. Accordingly, 506, 507, and 508 of method 500 allows networking device 200 to capture the costs of all the hops between the original hop and the networking device 200. In other words, networking device 200 may capture the recursive costs that may be added to the preferred route when the pathway to the original hop is altered.

Referring back to 508, based on a determination that the sequential hop is directly connected to networking device 200, method proceeds to 509, At 509, routing engine 201 determines whether there is a secondary route from the networking device to the destination computing device. Based on a determination that there is not, method 500 proceeds to 519.

Based on a determination that there is a secondary route, method 500 goes to 510. At 510, routing engine 200 determines whether a first hop for the secondary route is available. The first hop for the secondary route may be determined via a search of the routing data structure for the address of the destination computing device. A match that is different from the match given by the preferred route signifies that a secondary route is available to the destination computing device. The entry that matches may include an address for a networking device. This networking device is the first hop for the secondary route.

Based on a determination that there is not a first hop for the secondary route, method 500 proceeds to 519. This may occur when the first hop in the secondary route is not reachable and an entry for the first hop does not exist in the routing data structure. For example, an entry for the secondary route may exist in the routing data structure. The entry may list an address that corresponds to what would be a first hop in the secondary route. However, a search for the address in the routing data structure does not result in a match. Thus, the secondary route may go to a first hop that is not reachable from networking device 200.

Based on a determination that there is a first hop for the secondary route, method 500 proceeds to 511. At 511, routing engine 201 calculates a cumulative cost for the secondary route by using the cost of the first hop for the secondary route.

At 512, routing engine 201 determines if the first hop is directly connected to networking device 200. Based on a determination that the first hop is not directly connected to networking device 200, method proceeds to 513. Based on a determination that the first hop is directly connected to networking device 200, method proceeds to 516.

At 513, routing engine 201 determines a sequential hop in the secondary route. At 514, routing engine 201 determines the cost of the sequential hop and adds that cost to the cumulative cost for the secondary route. At 515, routing engine 201 determines whether the sequential hop is directly connected to networking device. Based on a determination that the sequential hop is not directly connected, method 500 goes back to 513, where it determines another sequential hop. Accordingly, a sequential hop may include a second hop, a third hop, a fourth hop, etc. in the secondary route. The next (n+1) hop may be determined by looking up the address associated with the current hop (n) in the data routing structure. For example, based on a determination that the first hop is not directly connected to networking device 200, routing engine 201 proceeds to 513. At 513, routing engine 201 determines a second hop in the preferred route. This may be done by looking up the address associated with the first hop in the data routing structure. As discussed above, this may be characterized as a recursive lookup. Accordingly, 512, 513, 514, and 515 of method 500 allows networking device 200 to capture the costs of all the hops of the secondary route between the first hop and networking device 200.

At 516, routing engine 201 determines whether the cumulative cost for the preferred route is higher than the cumulative cost for the secondary route. A determination that the cumulative cost for the preferred route is higher than the cumulative cost for the secondary route means that the secondary route has a higher priority than the altered preferred route (as determined in 502, 506). Based on that determination, method 500 proceeds to 520. At 520, forwarding engine 202 programs the new route using the secondary route. In some examples, the entry in the forwarding engine 202 correlates to the hop in the secondary route that directly connects to networking device 200.

Based on a determination that the cumulative cost for the preferred route is not higher than the cumulative cost for the secondary route, method 500 proceeds to 517. At 517, routing engine 201 determines whether the cumulative cost for the preferred route is equal to the cumulative cost for the secondary route. A determination that the cumulative cost for the preferred route is not equal than the cumulative cost for the secondary route (i.e. the cumulative cost for the preferred route is lower than the cumulative cost for the secondary route) means that the altered preferred route has a higher priority to route the packet to destination computing device. Based on this determination, method 500 proceeds to 519. At 519, forwarding engine 202 programs the new route using the altered preferred route. In some examples, the entry in the forwarding engine 202 correlates to the hop in the preferred route that directly connects to networking device 200.

Based on a determination that the cumulative cost for the preferred route is equal to the cumulative cost for the secondary route, method 500 proceeds to 518. At 518, forwarding engine 202 programs equal-cost multi-path (ECMP) routes using both the altered preferred route and the secondary route.

Although the flowchart of FIG. 5 shows a specific order of performance of certain functionalities, method 500 is not limited to that order. For example, some of the functionalities shown in succession may be performed in a different order, may be executed concurrently or with partial concurrence, or a combination thereof. In some examples, functionalities described herein in relation to FIG. 5 may be provided in combination with functionalities described herein in relation to any of FIGS. 1-4.

All of the features disclosed in this specification (including any accompanying claims, abstract and drawings), and/or all of the elements of any method or process so disclosed, may be combined in any combination, except combinations where at least some of such features and/or elements are mutually exclusive.

We claim:

1. A non-transitory machine-readable storage medium comprising instructions, that when executed, cause a processing resource to:
   determine a first hop for a preferred route from a networking device to a destination computing device;
   determine whether the first hop for the preferred route is directly connected to the networking device;
   based on a determination that the first hop for the preferred route is not directly connected to the networking device, determine a second hop for the preferred route;
   determine a cost for the second hop for the preferred route;
   determine a cumulative cost for the preferred route based on a cost of the first hop, the cost for the second hop and an original cost of the preferred route;
   determine whether a secondary route from the networking device to the destination computing device is available;
   in response to a determination that the secondary route is available, determine a first hop in the secondary route;
   calculate a cost of the first hop in the secondary route;
   determine a new route from the networking device to the destination computing device based on the cumulative cost of the preferred route and the cost of the first hop in the secondary route;
   enter the new route into a forwarding data structure of the networking device,
   calculate the cumulative cost for the preferred route based on the cost for the second hop.

2. The non-transitory machine-readable storage medium of claim 1, wherein the instructions to determine a new route comprises comparing the cumulative cost of the preferred route to the cost of the first hop in the secondary route.

3. The non-transitory machine-readable storage medium of claim 1, wherein the determination of the availability of the secondary route is based on a routing information base (RIB).

4. The non-transitory machine-readable storage medium of claim 1, wherein the forwarding data structure is a Forward Information Base (FIB).

5. The non-transitory machine-readable storage medium of claim 1, comprising instructions, that when executed, cause the processing resource to:
   determine whether the first hop for the secondary route is directly connected to the networking device;
   based on a determination that the first hop for the secondary route is not directly connected to the networking device, determine a second hop for the secondary route;
   determine a cost for the second hop for the secondary route;
   wherein the determination of the new route is based on the cost for the second hop of the secondary route.

6. The non-transitory machine-readable storage medium of claim 1, wherein the preferred route comprises an original hop and the first hop is between the original hop and the networking device.

7. The non-transitory machine-readable storage medium of claim 6, wherein the original cost of the preferred route comprises an administrative distance of an original pathway to the original hop.

8. A networking device comprising:
   a memory to store a forwarding data structure;
   a routing engine:
     to determine a preferred route for a packet from the networking device to a destination computing device, wherein the preferred route comprises an original cost;
     to determine a first hop for the preferred route, wherein the first hop comprises a cost;
     to determine whether the first hop for the preferred route is directly connected to the networking device;
     to determine a second hop for the preferred route based on a determination that the first hop is not directly connected to the networking device;
     to determine a cost for the second hop for the preferred route;
     to calculate a first cumulative cost for the preferred route based on the original cost, the cost of the first hop and the cost of the second hop;
     to determine whether a secondary route for the packet from the networking device to a destination computing device is available;
     to determine a first hop in the secondary route based on a determination that a secondary route is available;
     to determine a cost of the first hop in the secondary route; and
     to determine a new route to the destination device from the networking device based on the first cumulative cost of the preferred route and the cost of the first hop in the secondary route; and
   a forwarding engine to update the forwarding data structure with the new route.

9. The networking device of claim 8, wherein the preferred route comprises an original hop and the first hop is a hop between the original hop and the networking device.

10. The networking device of claim 8, wherein the routing engine is:
    to determine whether the first hop in the secondary route is directly connected to the networking device;
    to determine a second hop in the secondary route based on a determination that the first hop is not directly connected to the networking device;
    to determine a cost for the second hop in the secondary route;
    wherein the determination of the new route is based on the cost for the second hop in the secondary route.

11. The networking device of claim 8, wherein the memory is to store a routing data structure, wherein the determination of the first hop for the preferred route is based on the routing data structure.

12. A method comprising:
   determining, by a processing resource, a preferred route from a networking device to a destination computing device, wherein the preferred route is a static route;
   determining, by the processing resource, a first hop for the preferred route;
   determining, by the processing resource, whether the first hop for the preferred route is directly connected to the networking device; and
   based on a determination that the first hop is not directly connected, determining, by the processing resource, a second hop of the preferred route;
   calculating, by the processing resource, a first cumulative cost for the preferred route;
   determining, by the processing resource, a secondary route from the networking device to the destination computing device;
   determining, by the processing resource, a first hop in the secondary route;
   calculating, by the processing resource, a second cumulative cost for the secondary route;
   determining, by the processing resource, a new route based on a comparison of the first cumulative cost to the second cumulative cost; and
   programming, by the processing resource, the new route into a forwarding data structure of the networking device.

13. The method of claim 12, wherein the preferred route has an original cost; and
   wherein the step of determining a first cumulative cost is based on the original cost.

14. The method of claim 12, comprising:
   determining, by the processing resource, a cost for the second hop of the preferred route;
   wherein the first cumulative cost is determined based on the cost for the second hop of the preferred route.

15. The method of claim 12, comprising:
   determining, by the processing resource, a cost for a second hop of the secondary route;
   wherein the second cumulative cost is determined based on the cost for the second hop of the secondary route.

16. The method of claim 12, wherein the secondary route is a static route.

17. A method comprising:
   determining, by a processing resource, a preferred route from a networking device to a destination computing device, wherein the preferred route is a static route;
   determining, by the processing resource, a first hop for the preferred route;
   determine whether the first hop for the preferred route is directly connected to the networking device;
   based on a determination that the first hop for the preferred route is not directly connected to the networking device, determine a second hop for the preferred route;
   calculating, by the processing resource, a first cumulative cost for the preferred route, wherein the determination of the new route is based on the cost for the second hop of the preferred route;
   determining, by the processing resource, a secondary route from the networking device to the destination computing device;
   determining, by the processing resource, a first hop in the secondary route;
   calculating, by the processing resource, a second cumulative cost for the secondary route;
   determining, by the processing resource, a new route based on a comparison of the first cumulative cost to the second cumulative cost; and
   programming, by the processing resource, the new route into a forwarding data structure of the networking device.

18. The method of claim 17, comprising:
   determining, by the processing resource, whether the first hop for the secondary route is directly connected to the networking device;
   based on a determination that the first hop for the secondary route is not directly connected, determining, by the processing resource, a second hop of the secondary route;
   determining, by the processing resource, a cost for the second hop of the secondary route;
   wherein the second cumulative cost is determined based on the cost for the second hop of the secondary route.

19. The method of claim 17, wherein the preferred route has an original cost; and
   wherein the step of determining a first cumulative cost is based on the original cost.

20. The method of claim 17, wherein the secondary route is a static route.

* * * * *